United States Patent [19]

Psaar et al.

[11] Patent Number: 4,808,719

[45] Date of Patent: Feb. 28, 1989

[54] 1H-IMIDAZO[2,3-A]INDOL-2-ONES AS COLOR-FORMING AGENTS

[75] Inventors: Hubertus Psaar; Roderich Raue, both of Leverkusen, Fed. Rep. of Germany

[73] Assignee: Bayer Aktiengesellschaft, Leverkusen, Fed. Rep. of Germany

[21] Appl. No.: 60,189

[22] Filed: Jun. 9, 1987

[30] Foreign Application Priority Data

Jul. 1, 1986 [DE]  Fed. Rep. of Germany ....... 3622009

[51] Int. Cl.$^4$ ........................................... C07D 487/04
[52] U.S. Cl. ................................... 546/165; 546/166; 548/302
[58] Field of Search ................ 548/302; 546/165, 166

[56] References Cited

U.S. PATENT DOCUMENTS 3,565,902  2/1971  Wright ............................ 548/302 X
4,717,414  1/1988  Hunt ................................ 548/302 X

*Primary Examiner*—Richard A. Schwartz
*Attorney, Agent, or Firm*—Sprung Horn Kramer & Woods

[57] ABSTRACT

Compounds of the general formula

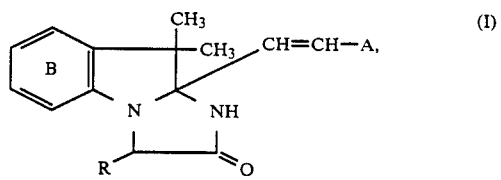

wherein
R represents hydrogen or alkyl and
A represents a radical of the formula

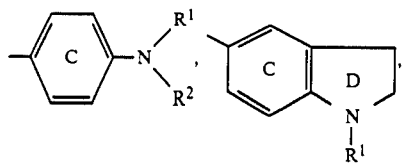

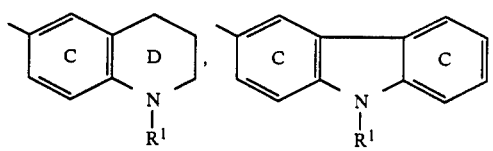

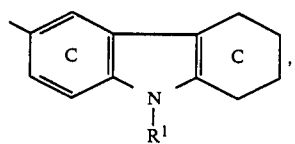

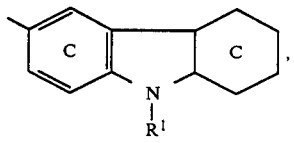

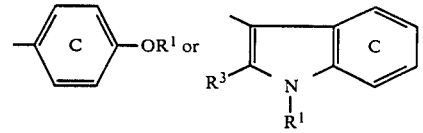

wherein
the rings D can carry up to 4 alkyl radicals,
$R^1$ and $R^2$ independently of one another represent alkyl, alkenyl, cycloalkyl, aryl or aralkyl and
$R^3$ represents hydrogen, alkyl or aryl, and the said cyclic and acyclic radicals and the rings B and C may carry nonionic substituents, are used as color-forming agents.

5 Claims, No Drawings

1H-IMIDAZO[2,3-A]INDOL-2-ONES AS COLOR-FORMING AGENTS

The invention relates to compounds of the general formula

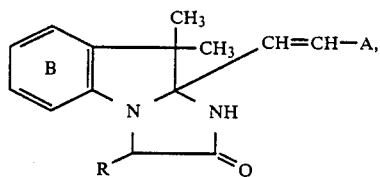

wherein
R represents hydrogen or alkyl and
A represents a radical of the formula

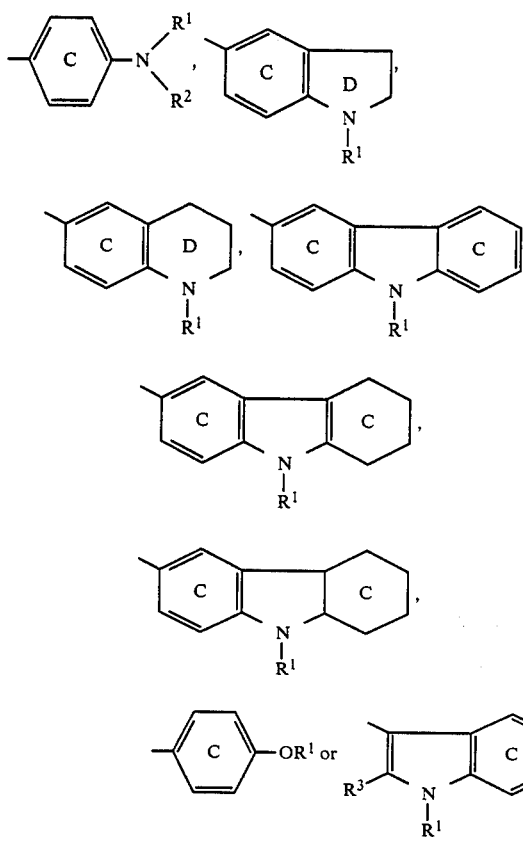

wherein the rings D can carry up to 4 alkyl radicals,
$R^1$ and $R^2$ independently of one another represent alkyl, alkenyl, cycloalkyl, aryl or aralkyl and
$R^3$ represents hydrogen, alkyl or aryl, and the said cyclic and acyclic radicals and the rings B and C may carry nonionic substituents, to a process for their preparation and to their use as colour-forming agents.

Suitable nonionic substituents are substituents which are customary in dyestuff chemistry and do not significantly influence the colour-forming properties of the basic molecule, such as alkyl, aryl, aralkyl, cyclohexyl, alkoxy, aryloxy, aralkoxy, halogen, cyano, nitro, alkylsulphonyl, carboalkoxy and carboxamide.

Preferred alkyl and alkenyl radicals are those with 1-4 and 2-4 C atoms respectively. The alkyl radicals may preferably carry a further nonionic substituent, such as Cl, CN, OH, $OCH_3$, $OC_2H_5$ or acetoxy. The $CF_3$ group is also a possible substituent. Methyl and ethyl are preferred.

Suitable aryl radicals are, above all, phenyl radicals which may be mono-, di- or tri-substituted by $C_1$-$C_4$-alkyl, $C_1$-$C_4$-alkoxy, Cl or $CF_3$.

Suitable aralkyl radicals are phenyl-$C_1$-$C_3$-alkyl radicals which may be substituted in the phenyl nucleus as described above. Benzyl and phenylethyl are preferred.

Suitable cycloalkyl radicals are 5-membered to 7-membered and may be mono-, di- or tri-substituted by $CH_3$ or Cl. Cyclohexyl is preferred.

Halogen represents fluorine, chlorine, bromine or iodine.

Preferred dyestuffs have the formula

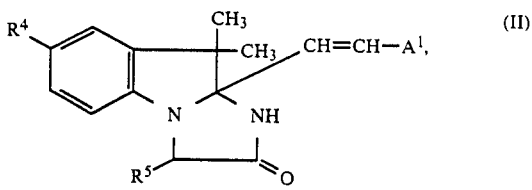

wherein
$R^4$ denotes hydrogen, chlorine, $C_1$-$C_4$-alkyl, trifluoromethyl, nitro, $C_1$-$C_4$-alkoxy, $C_1$-$C_4$-alkylsulphonyl, $C_1$-$C_4$-alkoxycarbonyl or cyano,
$R^5$ denotes hydrogen or $C_1$-$C_4$-alkyl and
$A^1$ denotes a radical of the formula

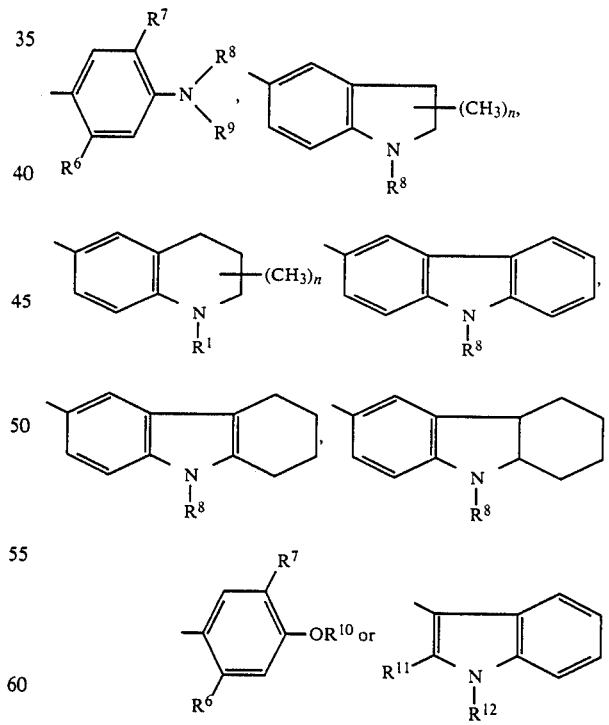

wherein
$R^6$ and $R^7$ independently of one another denote hydrogen, halogen, $C_1$-$C_4$-alkoxy or $C_1$-$C_4$-alkyl,
$R^8$, $R^9$ and $R^{12}$ independently of one another denote $C_1$-$C_4$-alkyl, cyano-, chlorine- or $C_1$-$C_4$-alkoxy-substituted $C_2$-$C_4$-alkyl or benzyl, $R^9$ furthermore denotes optionally $C_1$-$C_4$-alkoxy-substituted phenyl, $R^{12}$ furthermore denotes hydrogen, $R^{10}$ denotes $C_1$-$C_4$-alkyl or phenyl, $R^{11}$ denotes hydrogen, $C_1$-$C_4$-alkyl or phenyl and n denotes 0, 1, 2, 3 or 4.

Compounds of particular importance are those of the formula

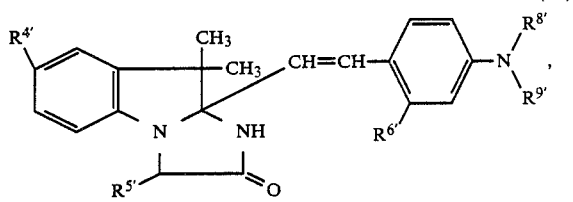
(III)

wherein $R^{4'}$ denotes hydrogen, chlorine, methyl, methoxy, carbomethoxy or methylsulphonyl, $R^{5'}$ denotes hydrogen or methyl, $R^{6'}$ denotes hydrogen, chlorine, methyl or methoxy, $R^{8'}$ and $R^{9'}$ denote $C_1$-$C_4$-alkyl, phenyl or benzyl.

Further compounds of importance are those of the formula

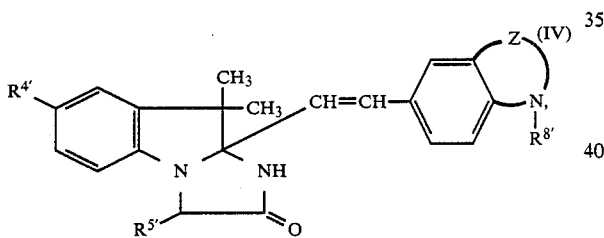
(IV)

wherein $R^{4'}$, $R^{5'}$ and $R^{8'}$ have the abovementioned meaning and

Z represents the members of the formula

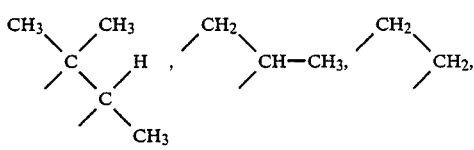

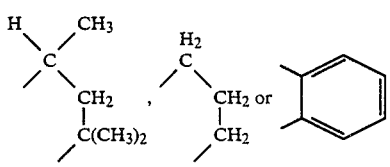

Further compounds of particular importance are those of the formula

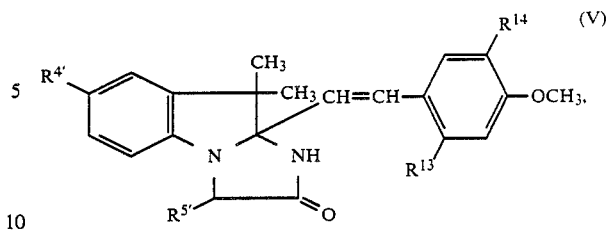
(V)

wherein $R^{4'}$ and $R^{5'}$ have the abovementioned meaning and $R^{13}$ and $R^{14}$ represent hydrogen or methoxy.

Also of particular importance are compounds of the formula

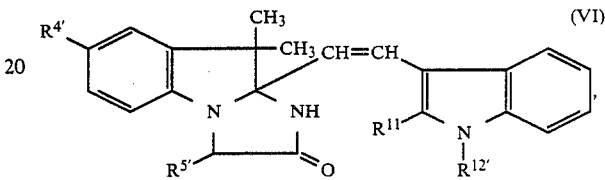
(VI)

wherein $R^{4'}$ and $R^{5'}$ have the abovementioned meaning and $R^{11'}$ represents hydrogen, methyl or phenyl and $R^{12'}$ represents hydrogen, methyl, ethyl, cyanoethyl or benzyl.

The invention further relates to a process for the preparation of the lactams of the formula I, characterized in that dyestuff salts of the formula

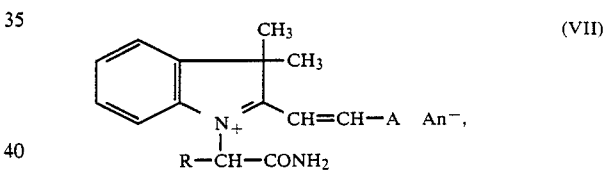
(VII)

wherein

R and A have the abovementioned meaning and $An^-$ denotes an anion from the series Cl, Br, acetate, sulphate or phosphate are reacted with inorganic bases, for example NaOH or KOH, or organic bases, for example triethylamine, in an aqueous or organic medium or in mixtures of both, it being advantageous, for complete lactam cyclization, to hat the compounds for some time in an organic solvent in the presence of an organic base.

A particularly advantageous process for the preparation of compounds of the formula I consists in that salts of the formula

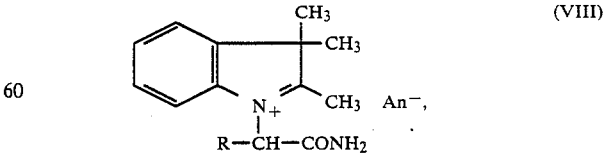
(VIII)

wherein R and $An^-$ have the abovementioned meaning are condensed with aldehydes of the formula $$O=CH-A \qquad (IX),$$

wherein A has the abovementioned meaning, in acetic acid, with or without addition of acetic anhydride, to give the dyestuff and, without isolation of the dyestuff salt, the latter is reacted—as described above—to give the lactam.

The lactams according to the invention are valuable colour-forming agents which—dissolved in hydrocarbons—give, upon contact with acid developers, i.e. an electron acceptor, very lightfast and intense colour shades. They are therefore very suitable for the preparation of pressure-sensitive or heat-sensitive recording materials, such as are described in U.S. Pat. Nos. 2,800,457, 2,800,458 and in DE-AS (German Published Specification) No. 1,251,348.

Furthermore, these colour-forming agents exhibit a lower sensitivity to unintentional premature development by heat or moisture than do the colour-forming agents described in U.S. Pat. No. 4,007,172.

EXAMPLE 1

26.9 g (0.1 mole) of 4-ethoxy-N-methyldiphenylaminealdehyde and 25.3 g (0.1 mole) of 1-carboxamidomethyl-3,3-dimethyl-2-methylene-indoline.HCl in 60 g of glacial acetic acid are stirred for 30 hours at 80° C., the mixture is poured into 1,000 ml of water and 100 ml of 45% strength sodium hydroxide solution, and the product is filtered off with suction, rinsed with 100 ml of water and dried in vacuo at 40° C. 46.7 g of a pale pink crystal powder are obtained. To complete the lactam cyclization, the product, in 100 ml of acetone, is stirred with 6 ml of triethylamine for 15 hours at 40° C. After recrystallization from toluene, a white product having a melting point of 188°–189° C. is obtained.

A solution of the product in toluene develops a strong red-violet colour on acid clay.

A solution in glacial acetic acid has a $\lambda_{max}$ of 556 nm.

The compound has the formula:

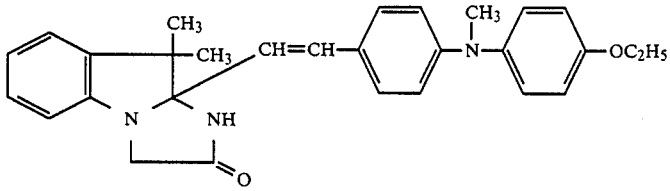

EXAMPLE 2

13.6 g (0.1 mole) of 4-methoxybenzaldehyde, 25.3 g (0.1 mole) of 1-carboxamido-3,3-dimethyl-2-methylene-indoline.HCl in 60 g of glacial acetic acid are stirred for 20 hours at 80° C. The batch is poured out into 1,000 ml of water and 100 ml of 45% strength sodium hydroxide solution and the product is filtered off with suction, washed with 200 ml of water and dried in vacuo at 40° C. 32 g of a pale yellow product are obtained. After recrystallization from toluene, a colourless compound having a melting point of 193°–194° C. is obtained. The product develops a reddish-tinged yellow colour shade on acid clay.

A solution in glacial acetic acid exhibits a $\lambda_{max}$ value of 440 nm. The compound has the formula:

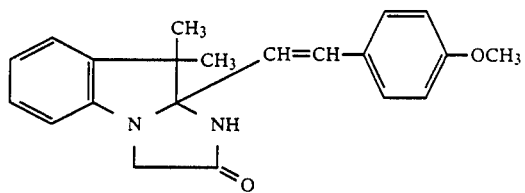

EXAMPLE 3

23.5 g (0.1 mole) of 1-methyl-2-phenylindole-3-aldehyde and 25.3 g (0.1 mole) of 1-carboxamidomethyl-3,3-dimethyl-2-methylene-indoline.HCl in 40 g of glacial acetic acid and 20 g of acetic anhydride are stirred for 5 hours at 80° C. The batch is stirred into 1,000 ml of 10% strength sodium hydroxide solution and the product is filtered off with suction, washed with water and dried in vacuo at 40° C. The yield is 41.7 g. After recrystallization from toluene, a colourless product having a melting point of 225°–226° C. is obtained. A solution in glacial acetic acid exhibits a $\lambda_{max}$ of 505 nm. A solution of the compound in toluene develops an orange colour on acid clay.

The product has the formula

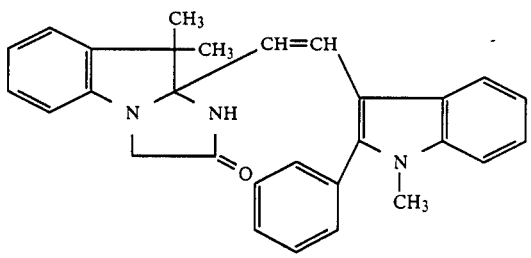

EXAMPLE 4

50 g of the dyestuff of the formula

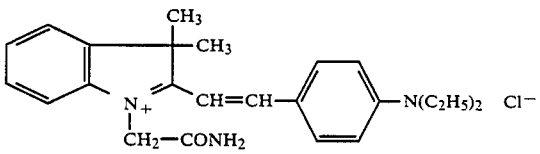

are dissolved in 50 g of glacial acetic acid and introduced, with stirring, into 1,000 ml of 10% strength sodium hydroxide solution. The product is filtered off with suction, washed with water and dried in vacuo at 40° C. 43 g of a compound of the formula

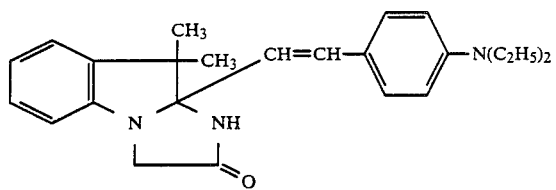

are obtained.

When recrystallized from toluene, the product has a melting point of 203°–204° C. When dissolved in toluene, the product develops a bluish-tinged red colour on acid clay. A solution of the compound in glacial acetic acid exhibits a $\lambda_{max}$ of 562 nm.

The following colour-forming agents are prepared analogously to Examples 1–4:

TABLE 1

Compounds of the formula

| Example | a | b | c | d | e | Colour shade on acid clay | $\lambda_{max}$ (nm) |
|---|---|---|---|---|---|---|---|
| 5 | H | H | N(CH$_3$)$_2$ | H | H | bluish-tinged red | 559 |
| 6 | " | " | " | H | CH$_3$ | " | 560 |
| 7 | 5-Cl | " | " | " | H | " | 565 |
| 8 | H | CH$_3$ | N(CH$_3$)(C$_2$H$_4$OCH$_3$) | " | " | " | 562 |
| 9 | 5-CH$_3$ | H | " | " | " | " | 565 |
| 10 | H | " | N(CH$_3$)(C$_2$H$_4$CN) | " | " | red | 540 |
| 11 | 5-Cl | " | N(C$_2$H$_5$)(C$_2$H$_4$CN) | " | CH$_3$ | bluish-tinged red | 548 |
| 12 | 5-OCH$_3$ | H | N(CH$_3$)(C$_2$H$_4$Cl) | H | H | pink | 550 |
| 12a | H | H | " | " | " | | 548 |
| 13 | H | " | N(C$_2$H$_4$CN)$_2$ | " | " | scarlet | 532 |
| 14 | 5-Cl | " | N(CH$_3$)(CH$_2$C$_6$H$_5$) | " | " | pink | 550 |
| 15 | H | " | N(CH$_2$—C$_6$H$_5$)$_2$ | " | " | " | 546 |
| 16 | H | " | N(CH$_3$)(C$_2$H$_4$CONH$_2$) | " | " | red | 552 |
| 17 | 5-NO$_2$ | " | N(C$_2$H$_5$)$_2$ | " | " | violet | 568 |
| 18 | H | " | N(CH$_3$)(C$_6$H$_5$) | " | " | violet | 552 |

TABLE 1-continued

Compounds of the formula

| Example | a | b | c | d | e | Colour shade on acid clay | $\lambda_{max}$ (nm) |
|---|---|---|---|---|---|---|---|
| 18a | 5-OCH₃ | | (N(CH₃)-C₆H₄-OC₂H₅) | " | " | " | 560 |
| 18b | 5-Cl | | " | " | " | " | 558 |
| 19 | 5-CN | H | N(C₂H₅)₂ | H | CH₃ | violet | 582 |
| 20 | 5-SO₂CH₃ | " | " | " | H | " | 585 |
| 21 | 5-CF₃ | " | " | " | CH₃ | " | 580 |
| 22 | 6-OCH₃ | " | N(CH₃)₂ | " | H | bluish-tinged red | 565 |
| 23 | H | " | (N(C₂H₅)-C₆H₄ at d) | | " | yellowish-tinged red | 492 |
| 24 | " | " | N(CH₃)-CH₂-CH₂- (d) | | " | bluish-tinged red | 560 |
| 25 | 5-Cl | " | N(CH₃)-CH(CH₃)-C(CH₃)₃ | | " | " | 565 |
| 25a | " | " | N(CH₂—C₆H₅)₂ | " | " | red | 556 |
| 25b | 5-OCH₃ | " | " | " | " | " | 540 |
| 26 | H | " | N(CH₃)-C(CH₃)₂-CH₂-CH(H)(CH₃) | | " | violet | 565 |
| 27 | 5-Cl | H | OCH₃ | H | H | reddish-tinged yellow | 446 |
| 28 | 5-OCH₃ | " | " | " | " | " | 445 |
| 29 | H | " | " | OCH₃ | " | " | 440 |
| 30 | " | " | " | H | OCH₃ | " | 465 |
| 31 | 5-Cl | CH₃ | " | " | " | " | 471 |
| 32 | 5-COOCH₃ | H | N(CH₃)₂ | " | " | violet | 568 |
| 33 | 5-OCH₃ | " | (N(CH₃)-C₆H₅) | " | " | " | 555 |
| 34 | H | CH₃ | OCH₃ | " | " | reddish-tinged yellow | 465 |
| 35 | 5-OCH₃ | H | " | " | " | " | 470 |

TABLE 2

Compounds of the formula

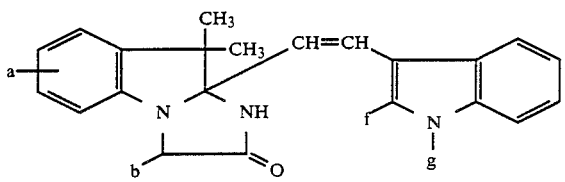

| Example | a | b | f | g | Colour shade on acid clay | $\lambda_{max}$ (nm) |
|---|---|---|---|---|---|---|
| 36 | H | H | $CH_3$ | H | orange | 500 |
| 37 | 5-Cl | " | ![p-phenylene] | $CH_3$ | " | 511 |
| 38 | H | " | " | $C_2H_5CN$ | " | 500 |
| 39 | " | " | $CH_3$ | $C_2H_5$ | " | 502 |
| 40 | " | $CH_3$ | H | $CH_3$ | " | 502 |
| 41 | 5-$OCH_3$ | H | " | $C_2H_5$ | " | 508 |
| 42 | " | " | $CH_3$ | $-CH_2-C_6H_5$ | " | 498 |

EXAMPLE 43

A 3% strength solution, in diisopropylnaphthalene, of the compound described in Example 1 is microencapsulated in a manner known per se with gelatin and gum arabic by coacervation, mixed with starch solution and spread on a sheet of paper.

A second sheet of paper is coated on the front face with acid-activated bentonite as the colour developer. The first sheet, and the sheet coated with the colour developer, are superposed adjacent to one another. Pressure is exerted by writing by hand, or with a typewriter, on the first sheet, and an intense red-violet copy having excellent fastness to light develops on the sheet coated with the developer.

EXAMPLE 44

33.6 g of bis-(4-hydroxyphenyl)-dimethylmethane and 75.8 g of an 8% strength aqueous polyvinyl alcohol solution, with addition of 8.4 g of zinc stearate, 10.1 g of stearamide and 123.2 g of water, are ground for 48 hours in a ball mill.

In a second ball mill, 4 g of the compound of Example 27 are ground in 20 g of an 8% strength aqueous polyvinyl alcohol solution.

7 parts of the developer dispersion are mixed with 1 part of the colour doner dispersion and spread on paper to give a dry coating weight of 6 g/m². When the coated paper is touched with a hot stylus, a lightfast yellow script is obtained.

EXAMPLE 45

10 g of a finely pulverulent polyacrylonitrile polymer obtained from 72% of acrylonitrile, 0.5% of methallylsulphonic acid, 26% of butylacrylate and 1.5% of acrylic acid are ground for 48 hours in a ball mill, with 56.3 g of a 2% strength aqueous polyvinyl alcohol solution, with addition of 0.15 g of distearyl phosphate and 2 g of benzyl 4-hydroxybenzoate.

A second dispersion is prepared from 4 g of the compound of Example 33 and 20 g of an 8% strength aqueous polyvinyl alcohol solution.

The dispersion of the colour-forming agent is mixed with the dispersion of the acceptor in the ratio of 1/10 and the mixture is spread on paper to give a dry weight of 7–8 g/m².

Upon contact with a heated stylus, a lightfast, sharp, violet script is obtained.

We claim:

1. A compound of the formula

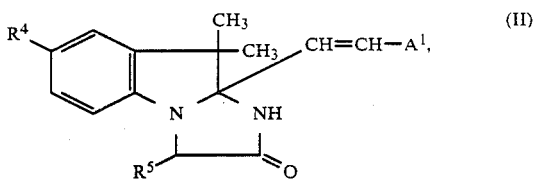

wherein $R^4$ denotes hydrogen, chlorine, $C_1$–$C_4$-alkyl, trifluoromethyl, nitro, $C_1$–$C_4$-alkoxy, $C_1$–$C_4$-alkylsulphonyl, $C_1$–$C_4$-alkoxycarbonyl or cyano, $R^5$ denotes hydrogen or $C_1$–$C_4$-alkyl and $A^1$ denotes a radical of the formula

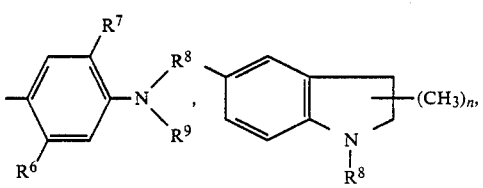

-continued

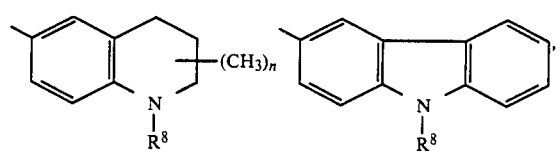

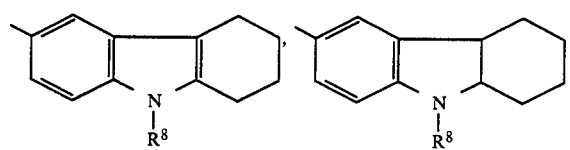

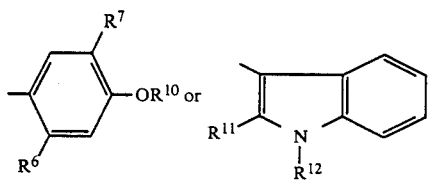

wherein
R⁶ and R⁷ independently of one another denote hydrogen, halogen, $C_1$-$C_4$-alkoxy or $C_1$-$C_4$-alkyl,
R⁸, R⁹ and R¹² independently of one another denote $C_1$-$C_4$-alkyl, cyano-, chlorine- or $C_1$-$C_4$-alkoxy-substituted $C_2$-$C_4$-alkyl or benzyl,
R⁹ furthermore denotes phenyl or phenyl substituted by $C_1$-$C_4$-alkoxy,
R¹² furthermore denotes hydrogen,
R¹⁰ denotes $C_1$-$C_4$-alkyl or phenyl,
R¹¹ denotes hydrogen, $C_1$-$C_4$-alkyl or phenyl and
n denotes 0, 1, 2, 3 or 4.

2. A compound according to claim 1, of the formula

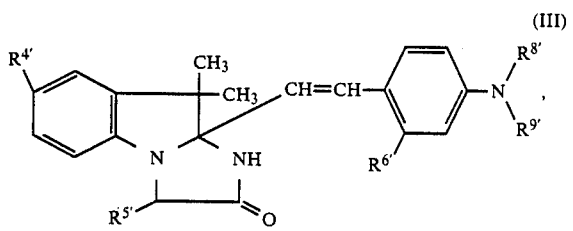

wherein
R⁴' denotes hydrogen, chlorine, methyl, methoxy, carbomethoxy or methylsulphonyl,
R⁵' denotes hydrogen or methyl,
R⁶' denotes hydrogen, chlorine, methyl or methoxy,
R⁸' and R⁹' denote $C_1$-$C_4$-alkyl, phenyl or benzyl.

3. A compound according to claim 1, of the formula

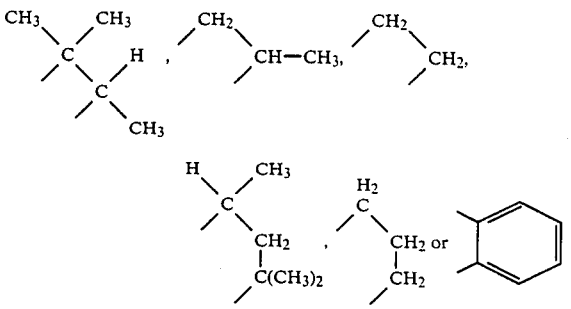

wherein
R⁴' denotes hydrogen, chlorine, methyl, methoxy, carbomethoxy or methylsulphonyl,
R⁵' denotes hydrogen or methyl, and
R⁸' denotes $C_1$-$C_4$-alkyl, phenyl or benzyl and
Z represents a member selected from the following formulae 4. A compound according to claim 1, of the formula

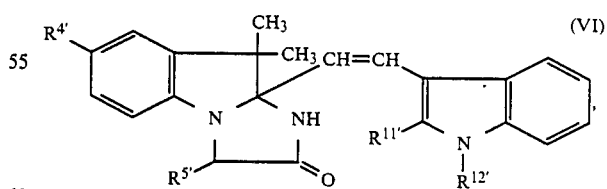

wherein
R⁴' denotes hydrogen, chlorine, methyl, methoxy, carbomethoxy or methylsulphonyl and
R⁵' denotes hydrogen or methyl and
R¹³ and R¹⁴ represent hydrogen or methoxy.

5. A compound according to claim 1, of the formula wherein
R⁴' denotes hydrogen, chlorine, methyl, methoxy, carbomethoxy or methylsulphonyl and
R⁵' denotes hydrogen or methyl and
R¹¹' represents hydrogen, methyl or phenyl and
R¹²' represents hydrogen, methyl, ethyl, cyanoethyl or benzyl.

* * * * *